United States Patent
Johnson et al.

(10) Patent No.: US 9,939,485 B1
(45) Date of Patent: Apr. 10, 2018

(54) PROGNOSTICS AND HEALTH MANAGEMENT OF PHOTOVOLTAIC SYSTEMS

(71) Applicant: Sandia Corporation, Albuquerque, NM (US)

(72) Inventors: Jay Johnson, Albuquerque, NM (US); Daniel Riley, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1013 days.

(21) Appl. No.: 14/023,296

(22) Filed: Sep. 10, 2013

Related U.S. Application Data

(60) Provisional application No. 61/726,463, filed on Nov. 14, 2012.

(51) Int. Cl.
  *G08B 21/00* (2006.01)
  *G01R 31/26* (2014.01)
  *G08B 21/18* (2006.01)

(52) U.S. Cl.
  CPC ....... *G01R 31/2605* (2013.01); *G08B 21/182* (2013.01)

(58) Field of Classification Search
  CPC .................................................... Y02E 60/12
  USPC ............ 700/297; 126/572; 136/244; 307/43
  See application file for complete search history.

(56) References Cited

U.S. PATENT DOCUMENTS

| | | | | |
|---|---|---|---|---|
| 8,918,225 B2 * | 12/2014 | Lazaris | ................... | H02J 3/382 290/44 |
| 8,931,475 B2 * | 1/2015 | Gilon | ......................... | F24J 2/07 126/572 |
| 8,933,320 B2 * | 1/2015 | Meyer | ............... | H01L 31/02008 136/244 |
| 8,963,368 B2 * | 2/2015 | Nair | ......................... | G05F 1/67 307/43 |
| 9,209,743 B2 * | 12/2015 | Hasegawa | ............... | H02S 50/10 |
| 9,299,238 B1 * | 3/2016 | Ahmad | ................ | A61B 5/4833 |
| 9,830,301 B1 * | 11/2017 | Batten | ..................... | G06F 17/00 |
| 2006/0033618 A1 * | 2/2006 | Miller | ................... | G08B 13/00 340/568.1 |

(Continued)

OTHER PUBLICATIONS

Abduhadi, et al., "Neuro-fuzzy-based Solar Cell Model", IEEE Trans. Energy Convers. 2004, vol. 19, No. 3, pp. 619-624.

(Continued)

*Primary Examiner* — Joseph Feild
*Assistant Examiner* — Rufus Point
(74) *Attorney, Agent, or Firm* — Martin I. Finston

(57) ABSTRACT

The various technologies presented herein relate to providing prognosis and health management (PHM) of a photovoltaic (PV) system. A PV PHM system can eliminate long-standing issues associated with detecting performance reduction in PV systems. The PV PHM system can utilize an ANN model with meteorological and power input data to facilitate alert generation in the event of a performance reduction without the need for information about the PV PHM system components and design. Comparisons between system data and the PHM model can provide scheduling of maintenance on an as-needed basis. The PHM can also provide an approach for monitoring system/component degradation over the lifetime of the PV system.

13 Claims, 7 Drawing Sheets

(56) References Cited

U.S. PATENT DOCUMENTS

| | | | | |
|---|---|---|---|---|
| 2011/0066401 | A1* | 3/2011 | Yang | G01J 1/4228 |
| | | | | 702/184 |
| 2012/0299731 | A1* | 11/2012 | Triener | G01G 17/08 |
| | | | | 340/573.1 |
| 2015/0123798 | A1* | 5/2015 | Boross | G08B 13/12 |
| | | | | 340/540 |
| 2015/0338447 | A1* | 11/2015 | Gallo | G01D 1/18 |
| | | | | 340/600 |
| 2017/0104447 | A1* | 4/2017 | Bintz | H04B 17/309 |

OTHER PUBLICATIONS

Al-Amooudi, et al., "Application of Radial Basis Function Networks for Solar-Array Modeling and Maximum Power-Point Prediction", IEEE Proc. Gener. Transm. Distrib., Sep. 2000, vol. 147, No. 5, pp. 310-316.

Chao, et al., "Modeling and Fault Diagnosis of a Photovoltaic System", Electron Power Systems Research 2008; vol. 78, pp. 97-105.

Chouder, et al., "Automatic Supervision and Fault Detection of PV Systems based on Power Losses Analysis", Energy Conversion and Management, 2010, vol. 51, No. 10, pp. 1929-1937.

Coleman, et al., "Intelligent Fault Detection and Diagnostics in Solar Plants", Intelligent Data Acquisition and Advanced Computing Systems (IDAACS), IEEE 6th International Conference Sep. 15-17, 2011, vol. 2, pp. 948-953.

Drews, et al., "Monitoring and Remote Failure Detection of Grid-connected PV Systems based on Satellite Observations", Solar Energy, Apr. 2007, vol. 81, Issue 4, pp. 548-564.

Elshatter, et al., "Fuzzy Modeling of Photovoltaic Panel Equivalent Circuit", Proceedings of the Photovoltaic Specialists Conference 2000, vol. 15, No. 22, pp. 1656-1659.

Hamdaoui, et al., "Monitoring and Control of the Performances for Photovoltaic Systems", International Renewable Energy Congress—Proc. IREC '09, Nov. 5-7, 2009, pp. 69-71.

Houssein, et al., "Monitoring and Fault Diagnosis of Photovoltaic Panels", Energy Conference and Exhibition (EnergyCon), 2010 IEEE International EC, Dec. 18-22, 2010, pp. 389-394.

Riley D.M., et al., "Comparison of a Recurrent Neural Network PV System Model with a Traditional Component-based PV system model", 37th Photovoltaic Specialists Conference, Seattle, WA, Jun. 19-24, 2011, pp. 1-6.

Stettler et al., "SPYCE: Satellite Photovoltaic Yield Control and Evaluation", Proceedings of the 21st European photovoltaic solar energy conference; 2006. pp. 2613-2616.

Syafaruddin, et al., "Controlling of Artificial Neural Network for Fault Diagnosis of Photovoltaic Array", Intelligent System Application to Power Systems (ISAP), 2011 16th International Conference, Sep. 25-28, 2011., pp. 1-6.

Yagi, et al., "Diagnostic Technology and an Expert System for Photovoltaic Systems Using the Learning Method", Solar Energy Materials & Solar Cells, 2003, vol. 75, pp. 655-663.

* cited by examiner

PROGNOSTICS AND HEALTH MANAGEMENT OF PHOTOVOLTAIC SYSTEMS

RELATED APPLICATION

This application claims priority to U.S. Provisional Patent Application No. 61/726,463, filed on Nov. 14, 2012, entitled "PROGNOSTICS AND HEALTH MANAGEMENT OF PHOTOVOLTAIC SYSTEMS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention

BACKGROUND

Various photovoltaic (PV) monitoring systems have been designed to facilitate measurement of such factors as module and array performance, grid stability, islanding, power factors, etc. Such monitoring systems can be built into inverters or converters and designed to connect/disconnect from the grid during low or high voltage events, prevent islanding, and report on PV status (e.g., current, voltage, power, etc.).

PV monitoring system concepts are designed to detect, classify, and/or locate faults when system behavior deviates from an expected operating condition. To facilitate prediction of an expected PV performance at a given time, various PV system models utilizing inputs from meteorological condition(s) have been created. These models can calculate expected power using such information as temperature and irradiance data gathered from sensors associated with a module/array, a transmission system(s), a weather monitoring system(s), a satellite system(s), etc. PV system models which have been utilized include PV circuit models, PV plant-specific fits, matter-element models, expert systems with updating warning criteria, etc. The PV system models, operating in conjunction with such measurements as current, voltage, power, etc., from the physical PV system are utilized to detect a number of fault conditions such as shading, inverter failure, snow cover, module failures, module short circuiting, string-level malfunctions, etc.

SUMMARY

The following is a brief summary of subject matter that is described in greater detail herein. This summary is not intended to be limiting as to the scope of the claims.

Various exemplary embodiments presented herein relate to provisioning prognosis and health management of a photovoltaic (PV) system. In an exemplary embodiment a PV system is presented, wherein the PV system comprises a modeling component configured to receive data associated with at least one parameter relating to current operation of the PV system, and further configured to output an anticipated operating metric relating to the at least one parameter. The PV system further comprising an operating component configured to receive data relating to an output of the PV system during the current operation of the PV system, and further configured to output an actual operating metric relating to the output of the PV system. The PV system also comprising a comparison component configured to determine whether a difference exists between the value of the anticipated operating metric and the actual operating metric.

Another exemplary embodiment pertains to a method, the method comprises receiving data associated with at least one parameter relating to a current operating condition of an energy system and generating, from the data, an anticipated operating metric relating to the at least one parameter. The method further comprising receiving data relating to an output of the energy system during the current operating condition of the energy system and generating an actual operating metric relating to the output of the energy system. The method further comprising determining whether a difference exists between the anticipated operating metric and the actual operating metric.

A further exemplary embodiment for provisioning prognosis and health management of a photovoltaic (PV) system pertains to a computer-readable medium comprising instructions that, when executed by a processor, cause the processor to perform acts comprising receiving data associated with at least one parameter relating to a current operating condition of a photovoltaic (PV) system and generating, from the data, an anticipated operating metric relating to the at least one parameter. The acts further comprising receiving data relating to an output of the PV system during the current operating condition of the PV system and generating an actual operating metric relating to the output of the PV system. The acts also comprising determining whether a difference exists between the anticipated operating metric and the actual operating metric.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
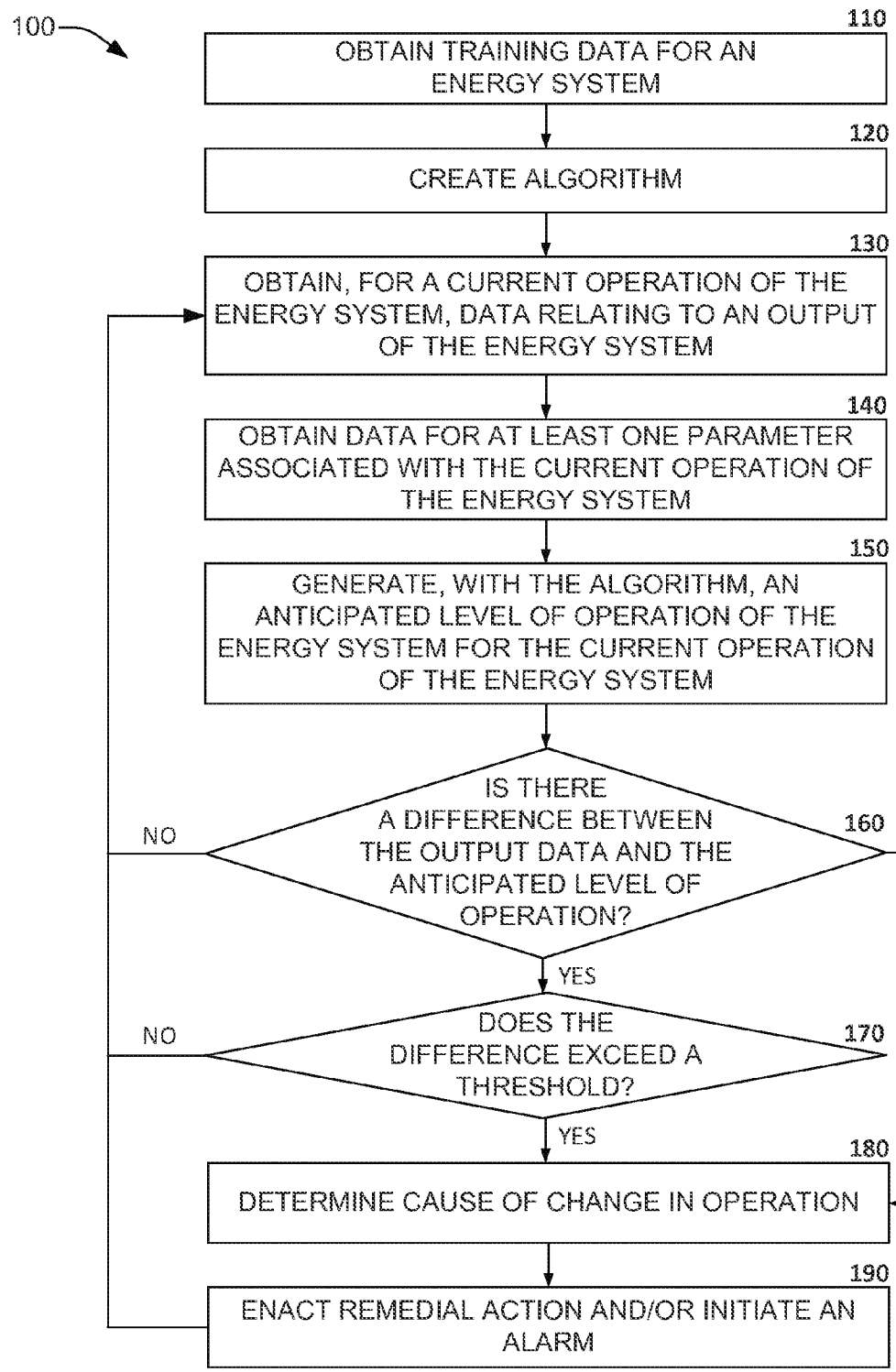
FIG. 1 is a flow diagram illustrating an exemplary methodology for providing prognosis and health management of a photovoltaic system.

Various technologies pertaining to provisioning prognosis and health management of a photovoltaic system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to providing prognosis and health management of a photovoltaic system. The various embodiments presented herein combine the technologies of PV modeling with prognostics and health management.

FIG. 1 illustrates an exemplary methodology relating to providing prognosis and health management of an energy system, such as a photovoltaic system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

At 110, data can be monitored for an energy system (e.g., a PV system), whereby the data can be obtained from various sensors and/or systems associated with the energy system. When directed towards a PV system, the data can include such parameters as plane of array (POA) irradiance, wind speed, ambient air temperature, any DC related parameter such as power, current, voltage, any AC related parameter such as power, current, voltage, power factor, etc., or combinations of these parameters, such as irradiance conversion efficiency and DC to AC power efficiency.

At 120, the data captured at 110 can form training data to be utilized in the formation of an algorithm, or model, such as an artificial neural network (ANN)-based model. For example, training data can be captured for a two month period after installation of the PV system, whereby the training data can be considered to reflect optimal operation of the PV system, and thus the operation of the ANN is optimized. Upon generating the ANN, the various parameters affecting any associated metric of the ANN can be determined and weighted accordingly. The ANN can be subsequently locked to the training data, weightings, etc., (i.e., further learning can be disabled). As mentioned, an initial period can be utilized to generate training data (e.g., an initial two month training period), whereby the PV system is considered to be operating optimally with minimal effects resulting from such effects as soiling, degradation, faults, etc. It is to be appreciated that training data can be portable in nature and hence, in an embodiment, while the training data is captured on a first PV system, the training data can be applied to a second PV system. In a further embodiment, the first PV system and the second PV system can both be constructed with similar componentry.

At 130, data relating to an output of the PV system can be obtained for a current operating condition of the PV system, where the current operating condition can be at a time or duration after the initial learning period has been completed. For example, in an appropriately configured PV system, an AC power output can be measured, while in another system a DC power output can be measured.

At 140, data can be obtained for at least one parameter associated with the PV system during the current operating condition of the PV system. The data can be obtained from various sensors and/or systems associated with the PV system, and can include such a parameter(s) as plane of array (POA) irradiance, wind speed, ambient air temperature, any DC related parameter such as power, current, voltage, any AC related parameter such as power, current, voltage, etc., as utilized as training data for the ANN.

At 150, the parameter data can be input into the algorithm, e.g., the ANN, to facilitate generation of an anticipated and/or predicted level of operation of the PV system for the current operational condition. For example, the ANN can determine from any of the measured plane of array (POA) irradiance, wind speed, ambient air temperature, etc., an anticipated AC power output for the PV system for the current operational condition.

At 160, a determination can be made regarding whether a value of the output of the PV system is different from a value of the anticipated level of operation of the PV system. For example, per the above, a determination can be made whether the measured AC power output is the same as the anticipated AC power output. In an example, the anticipated AC power output can be based upon a measured POA irradiance, which for a measured amount of solar radiation the ANN predicts a X-amount of AC power would be generated when the PV system was operating under optimal conditions (e.g., the conditions of operation for when the training data was captured). However, Y-amount of AC power is currently being generated at the output. For the example scenario, if Y<X then degradation of a photovoltaic material utilized in the PV system may be occurring. Hence, based on a material cost to energy produced, it may be prudent to replace the photovoltaic material to return the operational output of the PV system to be similar to that obtained during the training period. In response to there being no determined difference between the output value of the PV system and the anticipated level of operation of the PV system, the flow can return to 130 for further monitoring of the PV system to be conducted.

At 160, in response to a difference being determined between the output value of the PV system and the anticipated level of operation of the PV system, the flow can advance to 170. At 170, a determination can be made regarding whether the difference between a current condition (e.g., the AC power output) and optimal condition (e.g., the anticipated AC power output) is greater than a defined amount. For example, a determination can be made as to whether a metric (e.g., the AC power output) associated with a current operational condition exceeds a 10% threshold established based on the metric when the PV system is operating at the optimal condition (e.g., as established by the training data and the anticipated AC power output). In response to a determination that the current condition is below the defined threshold the flow can return to 130, whereupon further data relating to the next current operation of the PV system can be further captured and evaluated in comparison with the anticipated and/or optimal condition data.

At 170, in response to a determination that a metric relating to the current condition exceeds the associated defined threshold, the flow can advance to 180, whereby the captured data can be analyzed to determine a cause(s) for the PV system to operating outside of the threshold.

At 180, in association with 190, remedial action can be undertaken and/or an alarm can be created. For example, the alarm can be initiated indicating that there is an issue of possible concern regarding the operation of the PV system, and/or an associated component. In another example, analysis of the captured data can indicate a component or condition of the PV system needs to be evaluated (for example, the photovoltaic material, per the aforementioned example). In the case of a fault lying with a particular component, the component can be replaced and operation of the PV system can be re-initiated. Alternatively, as further explained herein, the training data may have been captured during a particular set of conditions (e.g., weather conditions associated with a particular season(s) that the training data was captured over), and the ANN may need to be refined for operation under the broader range of conditions that the PV system may experience. In an embodiment, if a given condition(s) varies by an appreciable amount over the course of operation of the PV system (e.g., throughout the course of the yearly seasons), a plurality of ANNs, or a single dynamic self-adjusting ANN, may be required to be configured so as to facilitate operation of the ANN(s) without going into an unnecessary alarm condition.

Figure 2:
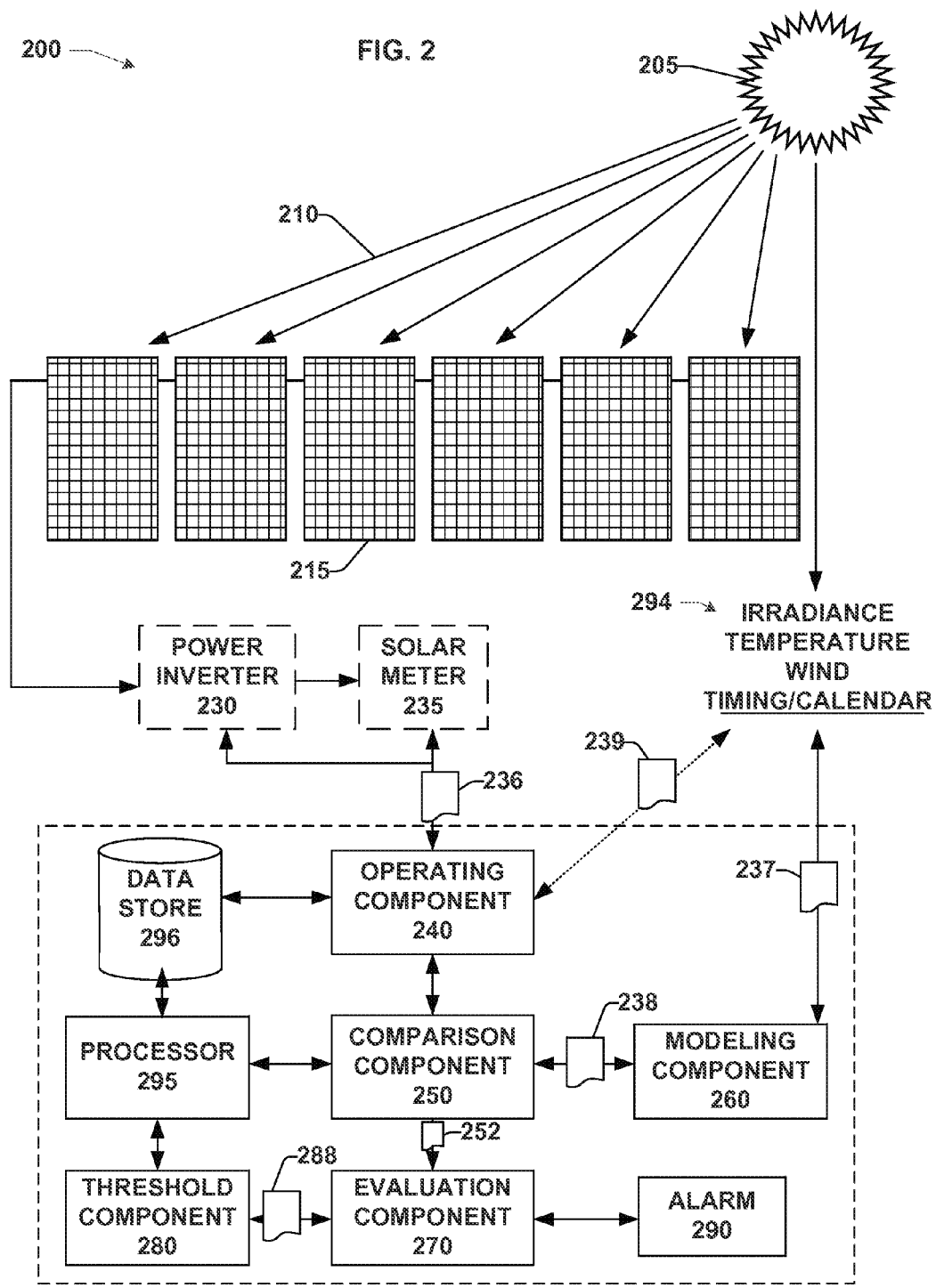
FIG. 2 illustrates a system for providing prognosis and health management of a photovoltaic system, according to an embodiment.

FIG. 2 illustrates a block diagram of PV PHM system 200, in accordance with an embodiment. In an embodiment, one or more of a solar cell(s), a solar module(s), or an array(s) 215 (hereinafter referred to as an array) can be receiving solar radiation 210 from the sun 205. Depending upon the configuration of system 200, for example, whether the power outputted from the array 215 remains in DC form, or a power outputted from the array 215 is to be converted to AC form, a power inverter 230 can be coupled to the power output of the array 215, where the power inverter 230 can be of any suitable device such as a charge controller, a DC/DC converter, a microinverter, or other power conversion component. Further a solar meter 235 can be connected to power output of array 215 to provide a measure of the power generated by the array 215. For example, power inverter 230 and/or solar meter 235 can provide an indication of an actual operating metric 236 (e.g., actual AC power) relating to the output of the array 215. The actual operating metric 236 can be received at operating component 240 whereupon any necessary data formatting can be undertaken. In an embodiment, the actual operating metric 236 can be based upon an average of a plurality of actual operating metrics measured over a time duration. For example, the AC power generated by array 215 can be captured over a period of time, whereby the measured generated AC power can be stored (e.g., in a data store 296) and recalled for an averaging algorithm to be applied to the stored data and any newly captured data. The actual operating metric 236 can be subsequently forwarded to a comparison component 250. As shown in FIG. 2, parameters such as irradiance, ambient temperature, wind speed, time, etc., (e.g., as a report 239) can be forwarded to operating component 240 to supplement the actual operating metric 236 to facilitate adjustment of one or more algorithms operating at operating component 240 to take into consideration a magnitude of the various parameters during operation of the array 215. In an embodiment, the data in report 239 can be utilized to supplement the actual operating metric 236, whereby the data can be utilized in the application of one or more heuristic rules, or other mathematical calculations, for any of generation of the actual operating metric 236, a comparison between the actual operating metric 236 and the anticipated operating metric 238, etc.

In conjunction with the generation of the actual operating metric 236, various sensors and/or systems 294 associated with array 215 can be providing operating data 237, which can include such parameter(s) as plane of array (POA) irradiance, wind speed, ambient air temperature, any DC related parameter such as power, current, voltage, any AC related parameter such as power, current, voltage, etc. The operating data 237 can be forwarded to modeling component 260, which can include any suitable mathematical operation, such as an ANN. The modeling component 260 can process the operating data 237 (e.g., irradiance data) to facilitate generation of an anticipated operating metric 238 (e.g., an anticipated AC power output) which can be forwarded to the comparison component 250.

The comparison component 250 can compare the value of the actual operating metric 236 with the value of the anticipated operating metric 238 to determine whether there is a difference between the two values. Any suitable technique can be utilized to perform the comparison, such as presented in Eqn. 1:

$$\% \text{ Energy Loss} = 100 * \left( \frac{\sum_n (P_{meas})}{\sum_n (P_{model})} - 1 \right) \qquad \text{Eqn. 1}$$

where
n=number of measurements in a time window;
$P_{meas}$=Measured metric (e.g., actual AC power 236);
$P_{model}$=Anticipated metric (e.g., anticipated AC power 238);

For example, if the sum of measured power is 5% less than the sum of the anticipated power, Eqn. 1 yields "−5". As mentioned, the testing duration can be broken down into "windows" (static or moving average) of fixed time period (e.g., 2 days), and the comparison calculation of Eqn. 1 can be performed for each window of captured data.

If a difference is determined, the difference 252 can be forwarded to an evaluation component 270. The evaluation component 270 can also receive a threshold setting 288 from threshold component 280, where threshold component 280 can be an interface, or the like, configured to facilitate entry of the threshold setting 288. Evaluation component 270 can be utilized to determine whether the difference between the actual operating metric 236 value and the anticipated operating metric 238 value is greater than the defined threshold setting 288. In the event of the difference being determined to be greater than the threshold setting 288, remedial action can be undertaken. Alarm component 290 can be configured to generate an alarm, where the alarm can be a digital notification (e.g., including a timestamp), an audible alarm, a visual alarm, etc. As previously mentioned, the alarm can be initiated indicating that there is an issue of possible concern regarding the operation of the PV system, and/or an associated component. Further, as previously mentioned, analysis of the captured data (e.g., the actual operating metric 236, anticipated operating metric 238, operating data 237, etc.) can indicate whether a component or condition of the PV system requires evaluation. As shown in FIG. 2, a processor component 295 can be utilized in conjunction with a data store 296 to facilitate operation of any of the components comprising system 200, e.g., operating component 240, comparison component 250, modeling component 260, evaluation component 270, threshold component 280, solar meter 235, power inverter 230, alarm component 290, etc. Data store 296 can be utilized to store one or more PHM models, an ANN-based model, training data, captured data, etc., which can be retrieved by processor 295, and any associated components. In an embodiment, data store 296 can have stored therein a database, lookup table, and the like which can be utilized to facilitate dynamically setting and/or adjusting the threshold setting 288. For example, the threshold setting 288 can be based upon duration of operation of the array 215 (or at least one of more components included in the array 215) whereby the lookup table can be accessed and a threshold setting 288 determined for the duration of operation. After a subsequent duration of operation the threshold setting 288 can be updated in accordance with a defined threshold setting 288 for the subsequent duration.

Accordingly, per the embodiments presented in FIGS. 1 and 2, the PV PHM system 200 can compare the measured metric of interest (e.g., actual AC power 236) to a prediction of the metric (e.g., anticipated AC power 238) from a model included in modeling component 260 operating on the sensor/system operating data 237. A benefit of using an ANN-based model is that no specific knowledge is required to be known regarding any operational specifics of the various components comprising the PV array 215. The ANN-based model can simply identify any relationships between the environment of the PV array 215 (input) and the operating metric (output).

Figure 3:
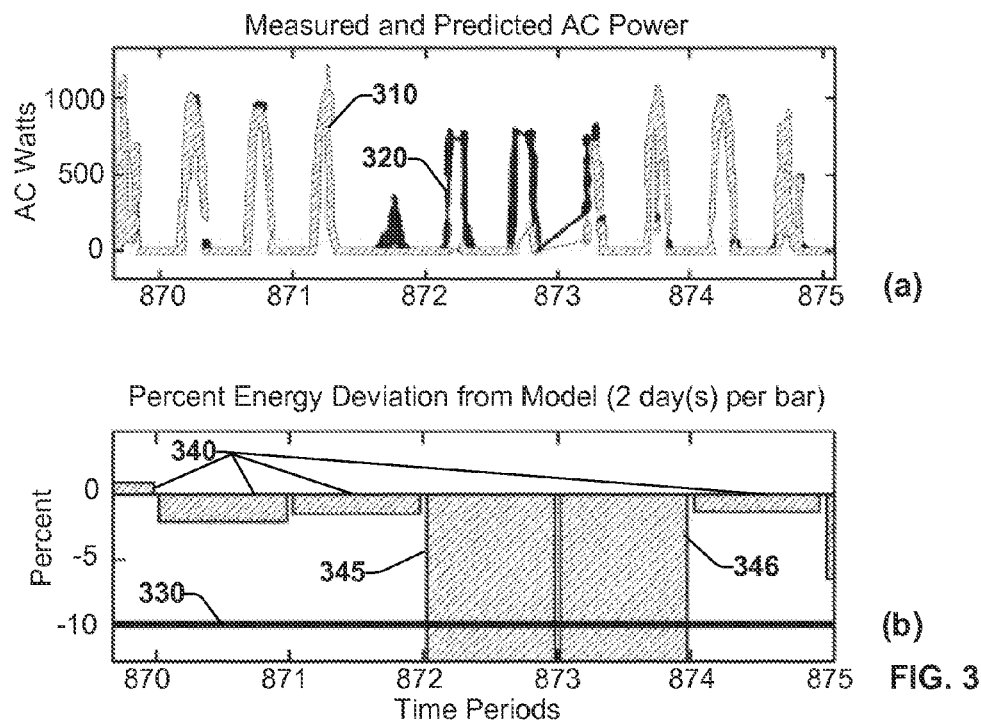
FIGS. 3a and 3b present plots illustrating ability to detect an error in a photovoltaic system, according to an embodiment.
Figure 4:
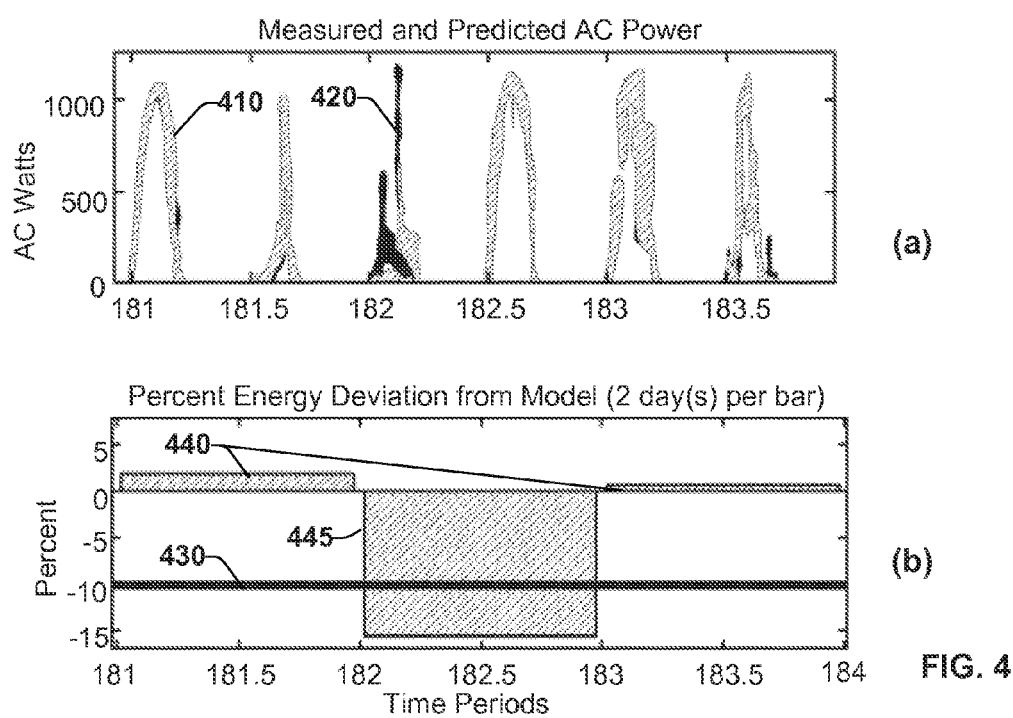
FIGS. 4a and 4b present plots illustrating ability to detect an error in a photovoltaic system, according to an embodiment.
Figure 5:
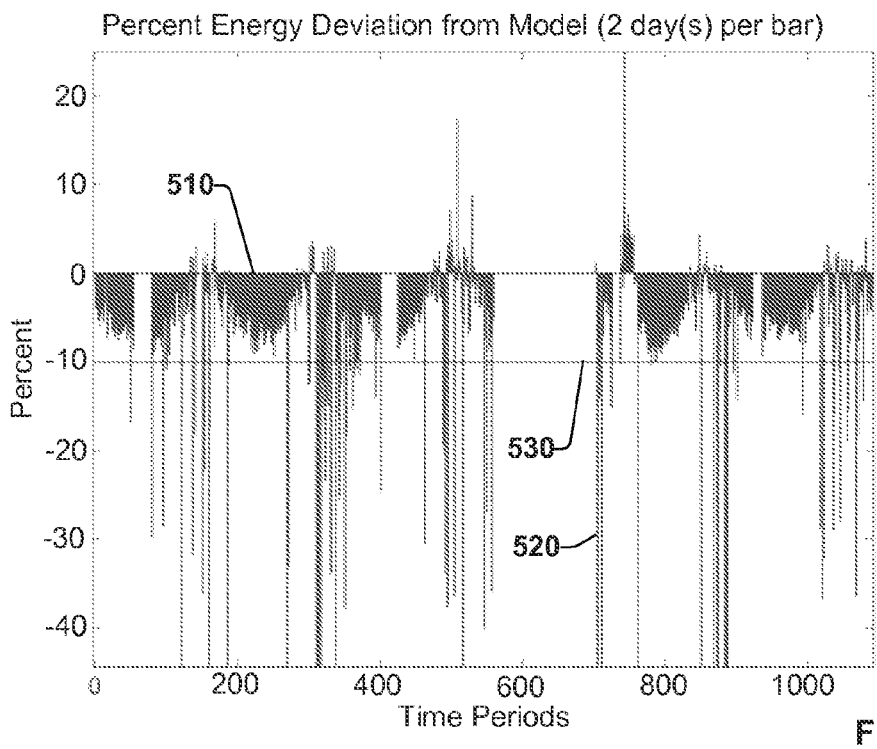
FIG. 5 illustrates a plot of differences between a predicted amount and an actual amount, according to an embodiment.
Figure 6:
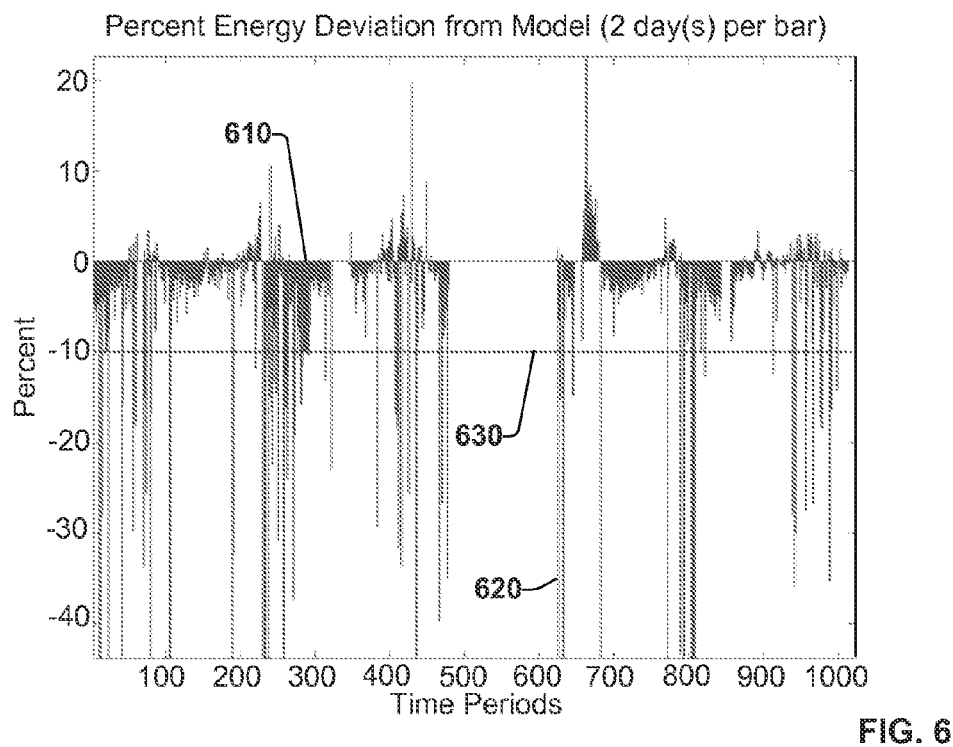
FIG. 6 illustrates a plot of prediction differences, according to an embodiment.

FIGS. 3a-b and 4a-b present respective plots from two different exemplary systems indicating an ability of the PV PHM comparison (e.g., between the measured metric of interest 236 and the anticipated metric 238) to detect one or more faults. FIG. 3a presents a measured data plot 310 (e.g., measured metric of interest 236) and a predicted data plot 320 (e.g., anticipated metric 238), where as shown, in the region for time periods 872 and 873, the measured data plot 310 had values below those of the predicted data plot 320. As shown in FIG. 3b, a number of percentiles 340 are below a threshold 330. However, between the time periods 872-874 percentile differences 345 and 346 had a magnitude that exceeded the threshold 330, which in the example PV system 1, was configured to be −10%. FIG. 4a presents a measured data plot 410 (e.g., measured metric of interest 236) and a predicted data plot 420 (e.g., anticipated metric 238), where as shown, in the region for time period 182, the measured data plot 410 had values below those of the predicted data plot 420. As shown in FIG. 4b, percentiles 440 had a magnitude below a threshold 430. However, between the time periods 182-183, the percentile difference 445 had a magnitude that exceeded the threshold 430, which in the example PV system 2, was configured to be −10%. As shown in FIGS. 3a-b and 4a-b, the PV PHM (e.g., an ANN-based model operating in modeling component 260) was able to detect a power drop in a PV system which resulted in energy losses of greater than an example threshold of 10% over the example window periods of 2 days. In an embodiment, the measured metric of interest 236 and the anticipated metric of interest 238 can be a single value or an average of a plurality of values measured over a time duration. For example, operating component 240 can receive measured data (e.g., a plurality of measured metrics of interest 236) from the solar meter 235, store the received data in data store 296, and after a specified duration over which the plurality of measured metrics 236 are measured, average the plurality of measured metrics 236 and compare the averaged value against an anticipated metric 238. It is to be appreciated that while the foregoing is directed towards a value comparison being conducted in view of a percentage error, any suitable approach to establish a difference between values in accord with a threshold are applicable to the various embodiments presented herein. For example, difference can be established based on a percentile difference, an absolute difference, a moving average, a derivative, etc. As mentioned, a training period over which training data is captured can have an effect on the ability for an ANN-based model to correctly predict a metric when the training period has weather that is different from the weather experienced during operational monitoring of a PV system. In an example scenario, initial implementation of a PV PHM system utilized an ANN trained on two months of concurrent weather and AC power data. When this example PV PHM ANN was utilized to predict performance of a PV system, the variance between the predicted output and the measured output of the PV system was highly correlated to the seasonal environment. For example, the ANN performed best under temperature conditions over which it was trained. FIG. 5 illustrates the seasonal variation, plot 510, for model errors relating to an ANN trained with only two months of training data for an example PV system. FIG. 6 illustrates output prediction differences, plot 610, for the same PV system. However, in this example the ANN was trained with six months of training data. The number of data plots 620 exceeding the example threshold of 10% is approximately equivalent to the number of data points 520 exceeding the same threshold. However, it can readily be seen that the volume of data points considered to be an operational error of the PV system is greater in FIG. 5 than FIG. 6, for example the volume of region 510, shown in FIG. 5, is greater than the volume of region 610.

In an exemplary embodiment, a PV PHM system can utilize any suitable metric and magnitude for an alarm threshold, for example, a 10% energy loss threshold, as previously mentioned with regard to Eqn. 1. However, the sensitivity of the alarm can be affected by the windowing period over which the summation occurs (i.e., the value of n in Eqn. 1). For example, summing over two days, as shown in FIGS. 3-6, can produce an acceptable indication of a problem(s) only after a fault in the PV system has persisted long enough to cause a significant energy loss. In an embodiment, the size of the windowing period may be reduced to facilitate an increase in the time sensitivity of the comparison, however such an approach may cause more false alarms, particularly during periods of low irradiance.

Figure 7:
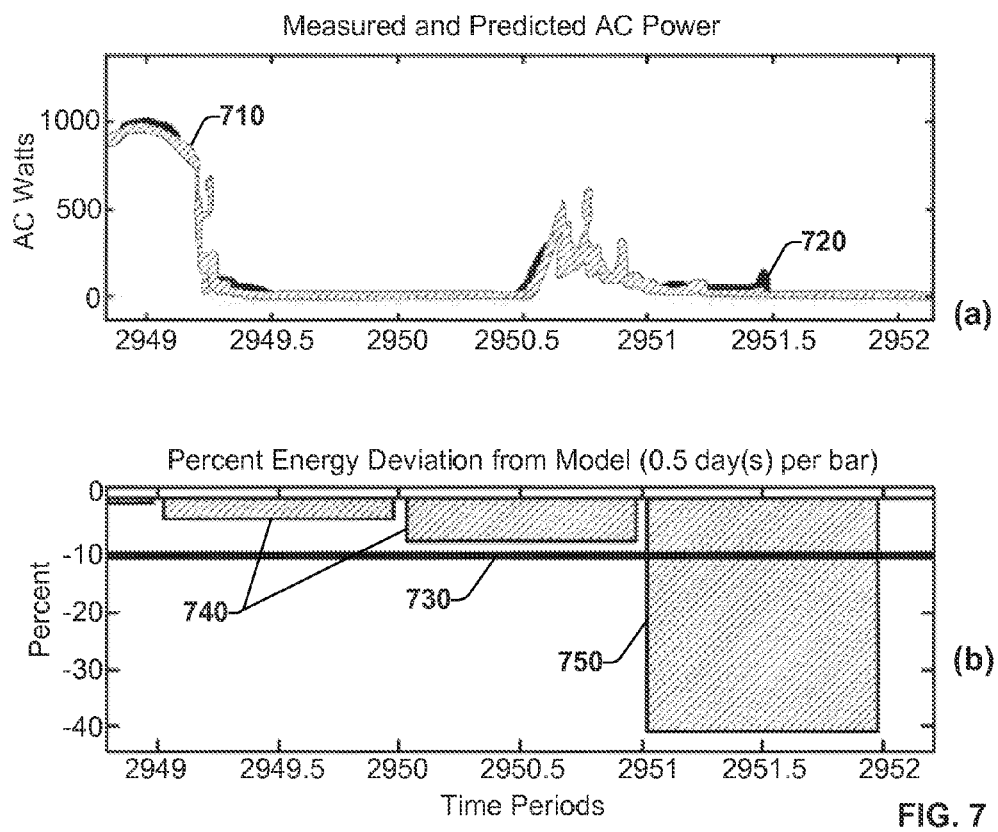
FIGS. 7a and 7b illustrate a plot of possible false alarm(s) as a function of summing window duration, according to an embodiment.

FIG. 7 illustrates such an effect, where plots 710 and 720 present data captured over a day and a half of operation of a PV system, where the spike in the predicted plot 720 exceeds the measured plot 710 and engenders a possible false alarm condition 750 in the percentage difference plots 740. The possible false alarm condition 750 can exceed the threshold 730 value of 10% as a function of a low irradiance and the possibly short (twelve hour) window period. Conversely, in another embodiment, the duration of the windowing period may be increased to reduce the time sensitivity of the comparison between a measured data plot (e.g., of a measured metric of interest 236) and a predicted data plot (e.g., an anticipated metric 238). Increasing the duration of the window period to several days or weeks may also enable a lower alarm threshold setting to be utilized, for example, about 4-6% instead of about 10%.

Figure 8:
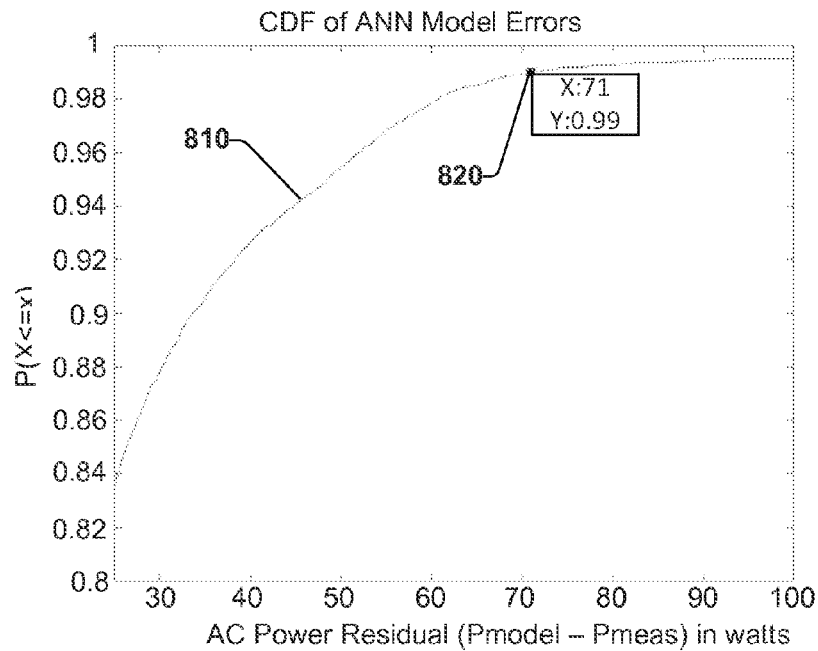
FIG. 8 illustrates a plot of cumulative distribution function of model error(s), according to an embodiment.

Using the energy loss metric (per Eqn. 1), there can be a potential tradeoff between a length of time which must pass to trigger an alarm and the possibility of false alarms being generated. A different comparison metric than the energy loss given by Eqn. 1 may be able to more rapidly determine a failure in a PV system. For example, if the statistics of the training data set are examined for PV system 1, the neural network's model residuals (i.e., $P_{AC, model}-P_{AC, measured}$) may be used to identify the likelihood of a PV system performing below the modeled performance. FIG. 8 illustrates a portion of the model residual cumulative distribution function (CDF) obtained from the neural network training data. In this example, there is a 1% chance that the model will overestimate the PV system's AC power by more than 71 watts (as indicated by point 820), and a 0.18% chance of the model overestimating by more than 200 watts.

Figure 9:
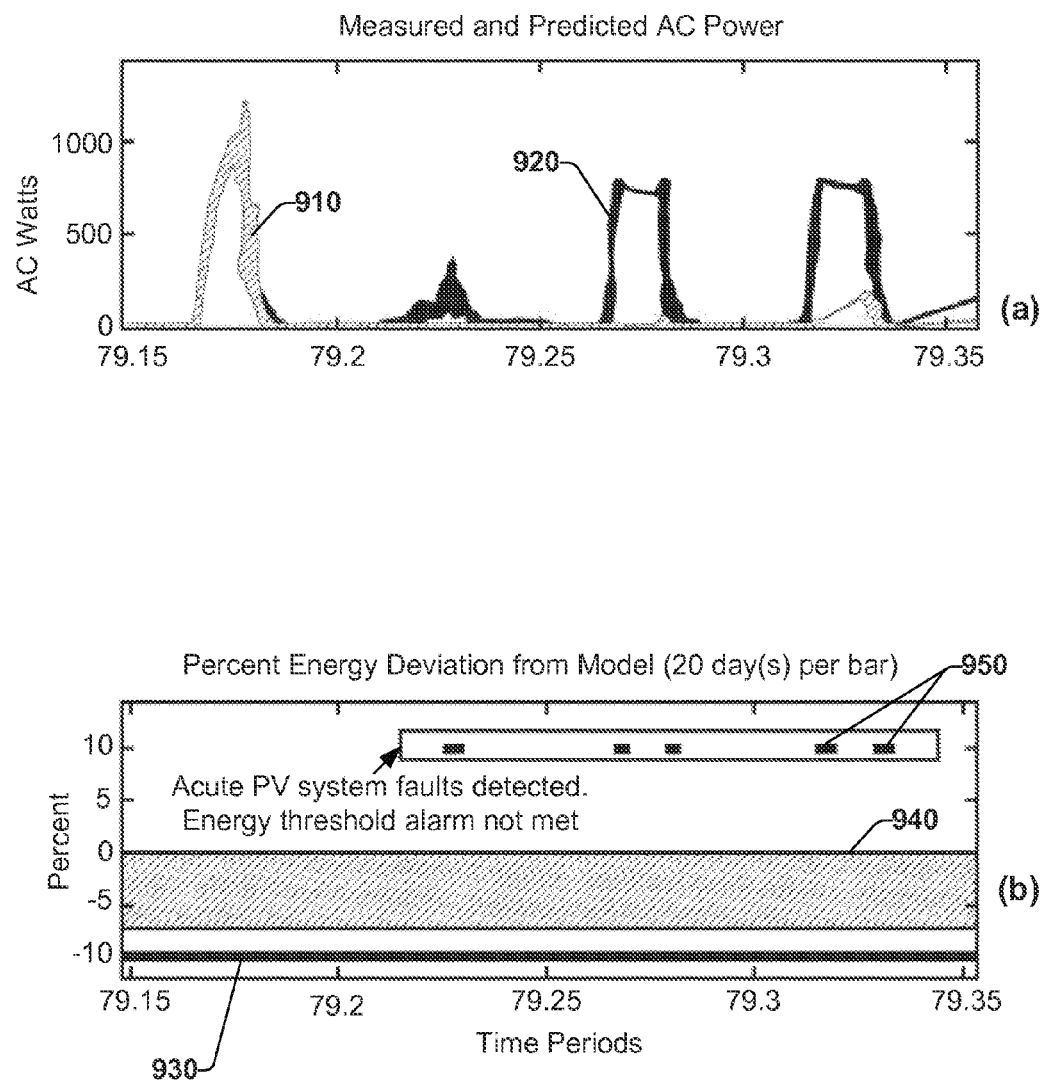
FIGS. 9a and 9b illustrate a plurality of plots relating to alarm triggering, according to an embodiment.

A method of detecting a PV system fault (e.g., an acute fault) can utilize the improbability of differences in the model prediction and the PV system output to detect a fault condition. FIG. 9 depicts measured metric plot 910 and predicted metric plot 920 of this approach to fault detection of a PV system. In the depicted example, with an energy summation window of 20 days, the PV system would not register a 10% loss in energy in the one and a half days of time when the system was malfunctioning.

However, the abnormally large drop in power can trigger an acute fault detection on a number of occasions, as shown by points 950, in a short period of time. It is to be appreciated that this approach to fault detection may be susceptible to generation of false positives under certain situations, for example, any instance where an inverter (e.g., inverter 230) is shut off (e.g., during temporary shading, a result of a grid abnormality, etc.) may register a fault due to abnormally high power loss. Thus it may be desirable to only trigger alarms after a series of consecutive fault detections over a time period of sufficient duration to enable the inverter to reconnect to the grid, regain maximum power point tracking, etc. In an aspect, the two fault detection criteria may be utilized simultaneously to facilitate monitoring of PV system performance and further, detecting various types of PV system faults. The energy loss fault detection approach can be useful for detecting long-term faults which may reduce PV system output such as material degradation, shade from growing trees, or excessive soiling. The acute fault detection approach can facilitate rapid detection of PV system faults which can reduce power output.

The advantage of utilizing a PV PHM system in comparison with a standard monitoring system (e.g., a system which only detects faults after they have occurred) is that a PHM system can be capable of predicting PV faults based on failure precursors. Determining precursors can be difficult and may require extensive historical analysis of system behaviors prior to different failure types. In some fault cases, failure precursors may be linked to failure modes. For instance, an instant drop of power could be attributed to the removal of one of the strings in a PV array (e.g., array 215).

In an ideal scenario, a precursor can indicate a specific failure, but some fault types may be indistinguishable by short term power comparisons, e.g., power reduction from shading can appear to be the same as module failure. Further, over long time-periods, a slight degradation may be due to soiling or long term degradation of photovoltaic material comprising a PV array. It is possible that the degradation curves due to module discoloration would be different from the degradation curves from soiling, but it can be difficult to ascertain without historical data. In the case of arc-faults, a precursor could be increasing series resistance due to module or connector corrosion. These various precursors can be incorporated into the PV PHM model to identify or predict failures in the PV system.

It is to be appreciated that while the various embodiments presented above are directed towards a system comprising a PV array, the various embodiments are not so limited. For example, the application of a model to facilitate provision of prognosis and health management of a system can also be applied to other energy systems such as wind, hydropower, tidal, wave, geothermal, biomass, renewable, nuclear, electrical, coal, etc., where parameters pertaining to the specific energy system (e.g., wind speed and/or wind direction for a wind-based energy system) can be monitored for application to an ANN for wind-energy. Further, an ANN does not have to be specific to a unique PV system, but rather, when an ANN has been constructed for a particular PV system it can be applied to another PV system for PHM determination thereon. In an aspect the particular PV system and the other PV system may, or may not, include the same system components.

Figure 10:
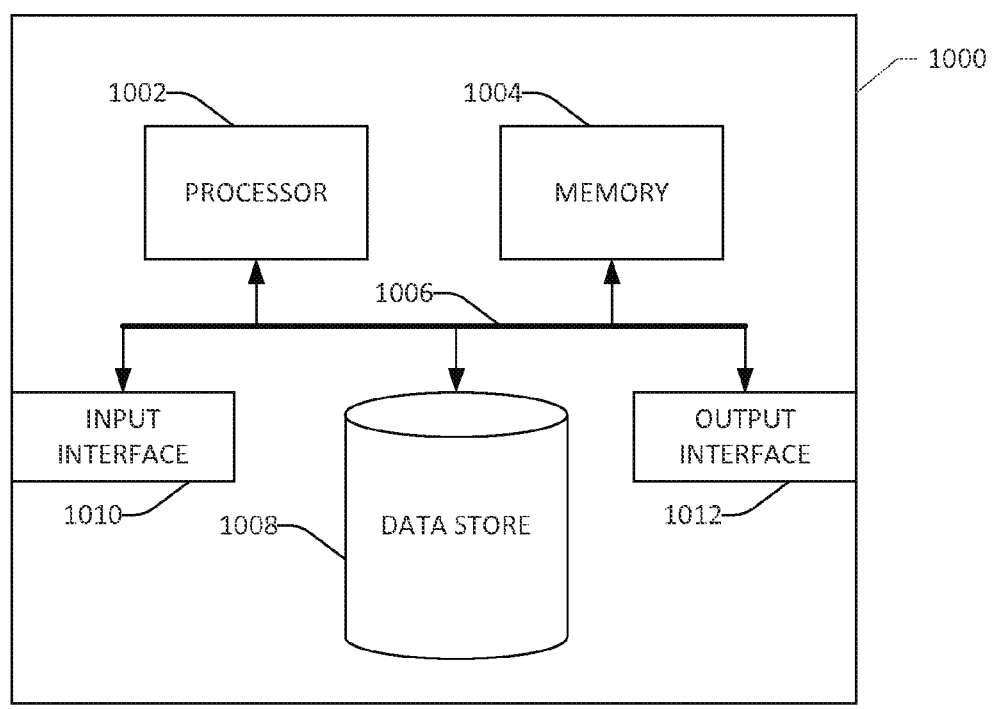
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be utilized in providing prognosis and health management of a photovoltaic system. For example, computing device 1000 can operate as one or more components of the system 200, e.g., processor 295, modeling component 260, etc. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store operating parameters, required operating parameters, and so forth.

The computing device 1000 additionally includes a data store 1008 that is accessible by the processor 1002 by way of the system bus 1006. The data store 1008 may include executable instructions, operating parameters, required operating parameters, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc., by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system that facilitates analyzing an output of a photovoltaic (PV) system, comprising:
   a modeling component configured to receive data associated with at least one parameter relating to current operation of the PV system, and further configured to output an anticipated operating metric relating to the at least one parameter;
   an operating component configured to receive data relating to an output of the PV system during the current operation of the PV system, and further configured to output an actual operating metric relating to the output of the PV system;
   a comparison component configured to determine whether a difference exists between the value of the anticipated operating metric and the actual operating metric; and
   an evaluation component configured to determine, in response to the comparison component determining that a difference exists between the value of the anticipated operating metric and the actual operating metric, whether the difference exceeds a threshold, the threshold being a defined value, percentage, or mathematical formula;
   wherein:
   the modeling component comprises an artificial neural network (ANN) and the comparison component is configured to compute at least some of the differences between anticipated and actual operating metrics by determining model residuals of the ANN;
   the artificial neural network has been configured based upon training data obtained prior to the current operation of the PV system;
   for determining whether the operating metric difference exceeds a threshold, the evaluation component considers metrics that relate to a time window of a first defined duration; and
   the evaluation component is further configured to determine for a time window of a second defined duration shorter than the first defined duration whether the ANN model residuals indicate a fault condition.

2. The system of claim 1, further comprising an alarm component configured to activate an alarm in response to the evaluation component determining that the difference exceeds the threshold.

3. The system of claim 1, wherein the evaluation component is further configured to compare training data with the data relating to an output of the PV system during the current operation of the PV system to identify a cause for the difference between the value of the anticipated operating metric and the actual operating metric.

4. The system of claim 1, wherein the at least one parameter is at least one of a plane of array (POA) irradiance, a wind speed, an ambient air temperature, a direct current (DC) power, a DC current, a DC voltage, an alternating current (AC) power, an AC current, or an AC voltage.

5. The system of claim 1, wherein the actual operating metric relating to the output of the PV system relates to at least one of a plane of array (POA) irradiance, a wind speed, an ambient air temperature, a direct current (DC) power, a DC current, a DC voltage, an alternating current (AC) power, an AC current, or an AC voltage.

6. A method, comprising:
receiving data associated with at least one parameter relating to a current operating condition of an energy system;
generating, from the data, an anticipated operating metric relating to the at least one parameter;
receiving data relating to an output of the energy system during the current operating condition of the energy system;
generating an actual operating metric relating to the output of the energy system;
determining whether a difference exists between the anticipated operating metric and the actual operating metric; and
when a difference is determined to exist between the anticipated operating metric and the actual operating metric, determining whether the difference exceeds a threshold, the threshold being a defined value, percentage, or mathematical formula;
wherein:
the determining whether a difference exists and the determining whether the difference exceeds a threshold are based at least in part on model residuals of an artificial neural network (ANN) that has been configured based upon training data obtained prior to the current operation of the energy system;
the steps of determining whether a difference exists and determining whether the difference exceeds a threshold are performed using anticipated operating metrics and actual operating metrics that relate to a time window of a first defined duration; and
the method further comprises determining, for a time window of a second defined duration shorter than the first defined duration, whether the ANN model residuals indicate a fault condition.

7. The method of claim 6, wherein the energy system is at least one of a photovoltaic (PV)-based energy system, a wind-based energy system, a hydropower-based energy system, a tidal-based energy based system, a wave-based energy based system, a geothermal-based energy based system, a biomass-based energy based system, a renewable energy-based energy based system, a nuclear energy based system, or a coal-based energy system.

8. The method of claim 6, further comprising, in response to determining the difference exceeds a threshold, activating an alarm.

9. The method of claim 6, wherein the at least one parameter is at least one of a plane of array (POA) irradiance, a wind speed, an ambient air temperature, a direct current (DC) power, a DC current, a DC voltage, an alternating current (AC) power, an AC current, or an AC voltage.

10. The method of claim 6, wherein the actual operating metric relating to the output of the PV system relates to at least one of a plane of array (POA) irradiance, a wind speed, an ambient air temperature, a direct current (DC) power, a DC current, a DC voltage, an alternating current (AC) power, an AC current, or an AC voltage.

11. A computer-readable storage medium comprising instructions that, when executed by a processor, cause the processor to perform acts comprising:
receiving data associated with at least one parameter relating to a current operating condition of a photovoltaic (PV) system;
generating, from the data, an anticipated operating metric relating to the at least one parameter;
receiving data relating to an output of the PV system during the current operating condition of the PV system; and
generating an actual operating metric relating to the output of the PV system;
determining whether a difference exists between the anticipated operating metric and the actual operating metric; and
when a difference is determined to exist between the anticipated operating metric and the actual operating metric, determining whether the difference exceeds a threshold, the threshold being a defined value, percentage, or mathematical formula;
wherein:
the determining whether a difference exists and the determining whether the difference exceeds a threshold are based at least in part on model residuals of an artificial neural network (ANN) that has been configured based upon training data obtained prior to the current operation of the energy system;
the steps of determining whether a difference exists and determining whether the difference exceeds a threshold are performed using anticipated operating metrics and actual operating metrics that relate to a time window of a first defined duration; and
the acts further comprise determining, for a time window of a second defined duration shorter than the first defined duration, whether the ANN model residuals indicate a fault condition.

12. The system of claim 1, wherein the evaluation component is configured to base determinations of fault conditions on probability distributions of the ANN model residuals, and wherein said probability distributions are based on the training data.

13. The method of claim 6, wherein the determining for the time window of the second defined duration whether the ANN model residuals indicate a fault condition is based on probability distributions of the ANN model residuals, and wherein said probability distributions are based on the training data.

* * * * *